United States Patent
Matsuda

(10) Patent No.: US 8,922,035 B2
(45) Date of Patent: Dec. 30, 2014

(54) LEISURE VEHICLE

(75) Inventor: Yoshimoto Matsuda, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 32 days.

(21) Appl. No.: 13/701,597

(22) PCT Filed: Jun. 3, 2011

(86) PCT No.: PCT/JP2011/062803
§ 371 (c)(1),
(2), (4) Date: Dec. 3, 2012

(87) PCT Pub. No.: WO2011/152522
PCT Pub. Date: Dec. 8, 2011

(65) Prior Publication Data
US 2013/0076034 A1    Mar. 28, 2013

(30) Foreign Application Priority Data
Jun. 4, 2010    (JP) .............................. P2010-128946

(51) Int. Cl.
*F02D 29/06*    (2006.01)
*F03B 13/10*    (2006.01)
*H02P 9/04*    (2006.01)
*H02P 9/02*    (2006.01)
*B62M 23/02*    (2010.01)
*H02P 9/48*    (2006.01)
*H02P 9/00*    (2006.01)

(52) U.S. Cl.
CPC ................ *H02P 9/02* (2013.01); *B62M 23/02* (2013.01); *F02D 29/06* (2013.01); *H02P 9/48* (2013.01); *H02P 2009/002* (2013.01)
USPC ............................................. 290/7; 290/40 C

(58) Field of Classification Search
USPC ................................................... 290/7, 40 C
See application file for complete search history.

(56) References Cited

U.S. PATENT DOCUMENTS 4,590,414 A * 5/1986 Mayumi et al. ................ 320/123
5,444,354 A * 8/1995 Takahashi et al. .............. 322/28
5,581,172 A * 12/1996 Iwatani et al. .................. 322/28

(Continued)

FOREIGN PATENT DOCUMENTS

JP    59-59099    4/1984
JP    61-247300    11/1986

(Continued)

OTHER PUBLICATIONS

International Search Report issued Sep. 6, 2011 in International (PCT) Application No. PCT/JP2011/062803.

*Primary Examiner* — Pedro J Cuevas
(74) *Attorney, Agent, or Firm* — Wenderoth, Lind & Ponack, L.L.P.

(57) ABSTRACT

In a leisure vehicle, the load applied to an engine is controlled so that a driving property and an output are improved. The leisure vehicle has a generator 30 to be driven by the engine for generating power, and a power generation control device 42 for controlling the generator 30, wherein the power generation control device 42 increases or decreases a power generation amount of the generator 30 under a predetermined condition regarding the power generation amount of the generator 30 to be increased or decreased in accordance with an increase or a decrease in engine speed.

8 Claims, 10 Drawing Sheets

(56) References Cited

U.S. PATENT DOCUMENTS

| | | | |
|---|---|---|---|
| 6,106,432 A * | 8/2000 | Nishida | 477/116 |
| 6,135,914 A * | 10/2000 | Yamaguchi et al. | 477/3 |
| 6,137,247 A * | 10/2000 | Maehara et al. | 318/140 |
| 6,892,701 B2 * | 5/2005 | Dillen et al. | 123/357 |
| 7,023,102 B2 * | 4/2006 | Itoh | 290/40 C |
| 7,406,370 B2 * | 7/2008 | Kojori et al. | 701/22 |
| 7,710,068 B2 * | 5/2010 | Tani et al. | 320/104 |
| 7,906,864 B2 * | 3/2011 | Ko | 290/40 C |
| 2004/0145187 A1 * | 7/2004 | Dillen et al. | 290/41 |
| 2004/0174018 A1 * | 9/2004 | Itoh | 290/40 C |
| 2005/0278104 A1 * | 12/2005 | Masuda et al. | 701/69 |
| 2006/0042846 A1 * | 3/2006 | Kojori et al. | 180/65.8 |
| 2008/0157539 A1 * | 7/2008 | Tani et al. | 290/40 C |
| 2008/0318729 A1 | 12/2008 | Asao et al. | 477/5 |
| 2014/0111012 A1 * | 4/2014 | Hyypio et al. | 307/52 |
| 2014/0203788 A1 * | 7/2014 | Andrejak et al. | 322/14 |
| 2014/0225575 A1 * | 8/2014 | Andrejak et al. | 322/28 |
| 2014/0277879 A1 * | 9/2014 | Sheidler et al. | 701/22 |

FOREIGN PATENT DOCUMENTS

| | | |
|---|---|---|
| JP | 2000-316300 | 11/2000 |
| JP | 2002-153097 | 5/2002 |
| JP | 2009-2228 | 1/2009 |

\* cited by examiner

LEISURE VEHICLE

TECHNICAL FIELD

The present invention relates to a leisure vehicle having a power generation control device.

BACKGROUND ART

Conventionally, a leisure vehicle (indicating a vehicle mainly used for leisure and the like such as a motorcycle, a three wheeler, an all terrain vehicle, and a small planing boat) has, as a power supply source to an electric load and a battery for a starter used at the time of starting an engine, lighting equipment such as a headlight, and the like, a generator to be driven by the engine for generating power, and a power generation control device for controlling power generation voltage and the like of the generator, supplying proper power to the electric load, and properly charging the battery. This power generation control device has a function of eliminating unnecessary power among the power generated by the generator by causing a short circuit.

In power generation by the generator, a load for rotating a rotor against a magnetic flux is applied to the engine. Even in a case where unnecessary power is eliminated by the power generation control device, the generator generates the unnecessary power, and an unnecessary load is applied to the engine.

FIG. 10 is an electric circuit diagram of a conventional motorcycle. Hereinafter, the above content will be described with using FIG. 10. An electric circuit 80 is formed so as to transmit an electric current from a generator 81 to a charging device 83 and a load 84 by a power generation control device 82, and further has diodes 85, 86, 87, 88, and thyristors 91, 92. The power generation control device 82 controls ON/OFF of the thyristors 91, 92.

In a case where the electric current is transmitted to the charging device 83 and the load 84, the power generation control device 82 turns OFF the thyristors 91, 92. As a result, the electric current from the generator 81 is transmitted to the charging device 83 and the load 84 through the diode 85 or the diode 86, and returned to the generator 81 through the diode 88 or the diode 87.

Meanwhile, in a case where the electric current is not transmitted to the charging device 83 and the load 84, that is, in a case where charging of the charging device 83 is not required and the load 84 does not require the power, the power generation control device 82 turns ON the thyristors 91, 92. As a result, the electric current from the generator 81 passes through the thyristor 92 or the thyristor 91, and is returned to the generator 81 through the diode 87 or the diode 88. The electric current is not transmitted to the charging device 83 and the load 84. In this case, the generator 81 is originally not required to generate the power. However, with the configuration of the electric circuit 80, the generator 81 generates the power, and as a result, the unnecessary load is applied to the engine.

SUMMARY OF INVENTION

Thus, an object of the present invention is to control a load applied to an engine by increasing or decreasing a power generation amount of a generator under a predetermined condition, so as to improve a driving property and an output of a leisure vehicle.

Solution to Problem

In a first aspect of the present invention, a leisure vehicle includes a generator to be driven by an engine for generating power, and a power generation control device for controlling the generator, wherein the power generation control device increases or decreases a power generation amount of the generator under a predetermined condition regarding the power generation amount of the generator to be increased or decreased in accordance with an increase or a decrease in engine speed.

According to the above configuration, when the driving property of the leisure vehicle is to be improved, the power generation control device decreases the power generation amount of the generator. Thus, the load applied to the engine by power generation of the generator can be reduced. By reducing the load applied to the engine, efficiency of torque of a crankshaft can be increased. As a result, the driving property of the leisure vehicle can be improved. When efficiency of the leisure vehicle is to be increased, the power generation control device increases the power generation amount of the generator. Thus, although the load applied to the engine by the power generation of the generator is increased, the output of the leisure vehicle can be improved.

The first aspect preferably further includes the following configurations.

(1) The predetermined condition is set based on an engine parameter influencing an output of the engine and/or a driving operation state of the leisure vehicle.

(2) When detecting acceleration of a predetermined value or more, the power generation control device decreases the power generation amount of the generator.

(3) When detecting deceleration of a predetermined value or more, the power generation control device increases the power generation amount of the generator.

(4) The leisure vehicle includes a speed detection device for detecting the engine speed, and a throttle opening position detection device for detecting a throttle opening position, wherein the power generation control device changes the power generation amount of the generator based on the engine speed detected by the speed detection device or the throttle opening position detected by the throttle opening position detection device.

(5) The leisure vehicle includes a charging device to be charged by power generation of the generator, wherein when detecting acceleration after suppressing the output of the engine, the power generation control device decreases the power generation amount of the generator or makes the charging device discharge and rotates a rotor of the generator.

(6) The leisure vehicle includes a charging device to be charged by power generation of the generator, a throttle opening position detection device for detecting a throttle opening position, and a brake detection device for detecting brake pressure, wherein when the brake detection device detects that the brake pressure becomes predetermined pressure or more and then becomes other set pressure or less which is lower than the predetermined pressure and the throttle opening position detection device detects that the throttle opening position shifts from a predetermined throttle opening amount to a predetermined throttle opening increase rate or more, the power generation control device decreases the power generation amount of the generator for a predetermined time or makes the charging device discharge and rotates the rotor of the generator, so as to increase the engine speed.

(7) The leisure vehicle includes a slip ratio detection device for detecting a slip ratio based on the wheel rotation number, wherein the power generation control device changes the power generation amount of the generator for a predetermined time based on the slip ratio detected by the slip ratio detection device.
(8) The generator further has an auxiliary generator provided in a front wheel of the leisure vehicle, and the power generation control device controls the auxiliary generator under a predetermined condition.
(9) In the above configuration (8), the power generation control device controls the generator and the auxiliary generator in synchronization.

In the above configuration (1), the predetermined condition for increasing or decreasing the power generation amount the generator is set based on the engine parameter influencing the output of the engine and/or the driving operation state of the leisure vehicle. The engine parameter influencing the output of the engine includes engine speed, an engine speed increase/decrease rate, a throttle opening position, an ignition state (including ignition timing and cylinder deactivation), a fuel injection amount, a gear ratio, and combination of these parameters. The driving operation state includes an acceleration changing operation, a speed changing operation, a steering operation, a clutch operation, and a transmission gear ratio switching operation. For example, the acceleration changing operation includes a throttle opening position and an accelerator operation amount for reaching to a change in the throttle opening position, and a brake operation amount relating to brake pressure.

In the above configuration (2), acceleration detection includes a case where an engine speed increase rate is a predetermined value or more and a throttle opening increase rate is a predetermined value or more.

In the above configuration (3), deceleration detection includes a case where an engine speed decrease rate is a predetermined value or more, a throttle opening decrease rate is a predetermined value or more, and the brake pressure is a predetermined value or more.

In the above configuration (4), when the engine speed or the throttle opening position is within a predetermined range, the power generation amount may be decreased, and when the engine speed and the throttle opening position are in a range other than the predetermined range, the power generation amount may be increased.

In a second aspect of the present invention, a leisure vehicle includes a generator to be driven by an engine for generating power, a power generation control device for controlling the generator, and a charging device to be charged by power generation of the generator, wherein when detecting acceleration after suppressing an output of the engine, the power generation control device makes the charging device discharge and rotates a rotor of the generator, so as to give motive power to wheels.

According to the above configuration, when the driving property of the leisure vehicle is to be improved, the power generation control device makes the charging device discharge and rotates the rotor of the generator, so as to give the motive power to the wheels. Thus, the load applied to the engine can be reduced. By reducing the load applied to the engine, the efficiency of the torque of the crankshaft can be increased. As a result, the driving property of the leisure vehicle can be improved.

Advantageous Effects of Invention

In sum, according to the present invention, the leisure vehicle in which the load applied to the engine is controlled and the driving property and the output are improved can be provided.

DESCRIPTION OF EMBODIMENTS

FIGS. 1 to 5 show one embodiment of a leisure vehicle according to the present invention and several control methods of a power generation control device of the leisure vehicle. With these figures, the embodiment according to the present invention and the control methods will be described.

Figure 1:
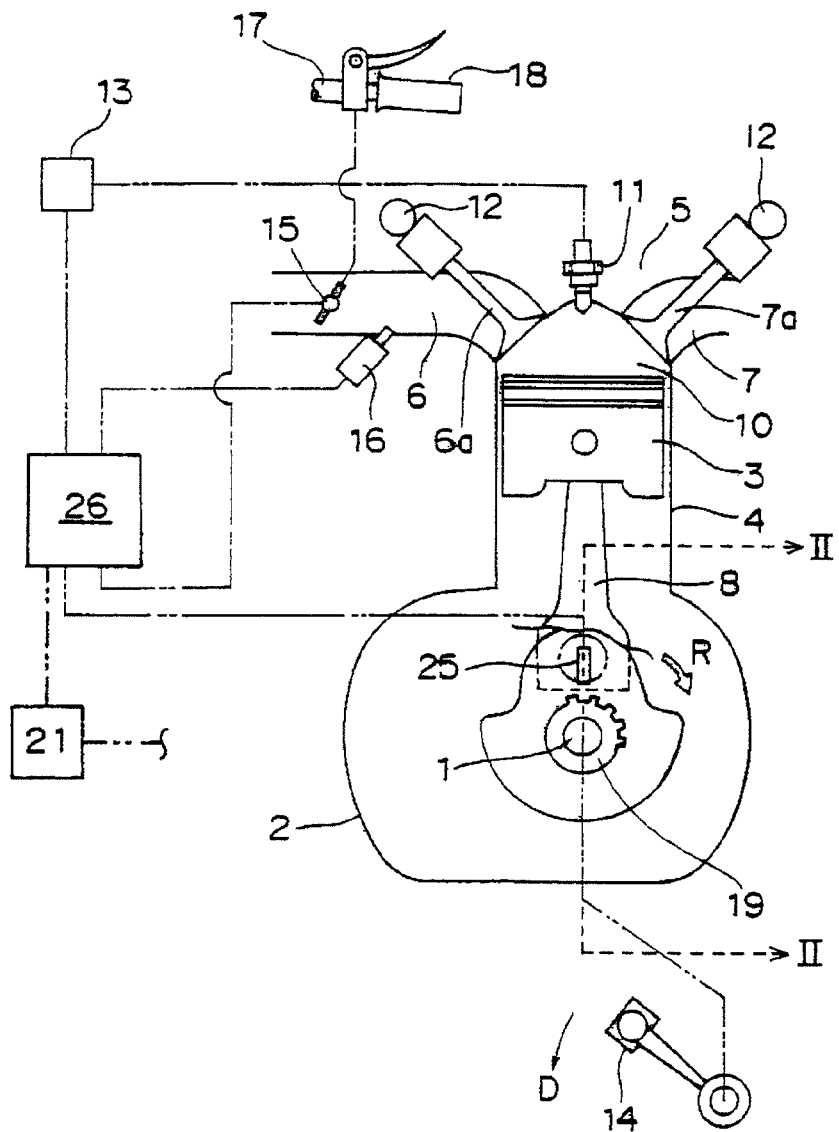
FIG. 1 is a vertically sectional schematic view of an engine of a motorcycle.

FIG. 1 is a vertically sectional schematic view of an engine. This engine is mounted in a motorcycle, and as well known, provided with a crankcase 2 accommodating a crankshaft 1, a cylinder 4 slidably fitted to a piston 3, a cylinder head 5, and other members. The crankshaft 1 is coupled to the piston 3 via a connecting rod 8. In a combustion chamber 10 surrounded by a top wall of the piston 3, an inner wall (liner) of the cylinder 4, and a lower surface of the cylinder head 5, an intake passage 6 and an exhaust passage 7 are openably and closably opened via an intake valve 6a and an exhaust valve 7a, respectively. An ignition plug 11 is provided in an upper part of the combustion chamber 10. The ignition plug 11 is electrically connected to an igniter 13 so as to form an ignition device. The igniter 13 is electrically connected to an electronic control unit (ECU) 26 serving as a control means, so that by an ignition signal sent from the ECU 26, the igniter 13 raises pressure and the ignition plug 11 generates a spark. The intake valve 6a and the exhaust valve 7a are respectively interlocked and coupled to cams proportionally rotated in conjunction with the crankshaft 1, and opened and closed at predetermined timing.

A kick pedal 14 is interlocked and coupled to the crankshaft 1 via a starting power transmission mechanism such as a gear mechanism. When a passenger of the motorcycle presses down the kick pedal 14 in the arrow D direction, kicking force (force on pedal) thereof is transmitted to the crankshaft 1, so that the crankshaft 1 is rotated in the arrow R direction. It should be noted that the arrow R direction is the forward rotation direction of the engine at the time of driving.

A throttle valve 15 and a fuel injector 16 are provided in the intake passage 6 in this order from the intake upstream side. The throttle valve 15 is mechanically or electrically coupled to a throttle grip 18 of a handle 17. The throttle valve 15 is electrically connected to the ECU 26. As a result, the ECU 26 recognizes a throttle opening position of the throttle valve 15. That is, the ECU 26 is a throttle opening position detection device for detecting the throttle opening position. The ECU 26 is electrically connected to a brake hydraulic portion 21, so as to recognize brake pressure. That is, the ECU 26 is a brake detection device for detecting the brake pressure. Further, the ECU 26 is electrically connected to the fuel injector 16.

In order to detect ignition timing by the ignition plug 11 and crankshaft speed (engine speed), a disc shape rotor 19 is secured to the crankshaft 1, and one magnetic pickup 25 facing the rotor 19 from the outer side in the radial direction is arranged as a detection means. The magnetic pickup 25 is electrically connected to the ECU 26, so as to input a detection signal such as the ignition signal to the ECU 26.

When the signal is inputted to the ECU 26, the magnetic pickup 25 detects the signal, and speed of the rotor 19 fitted to the crankshaft 1 is calculated from an interval of detection thereof. As a result, the engine speed is calculated. That is, the ECU 26 is a speed detection device for detecting the engine speed. The ECU 26 detects a slip ratio from the rear wheel rotation number and the front wheel rotation number. That is, the ECU 26 is a slip ratio detection device.

Figure 2:
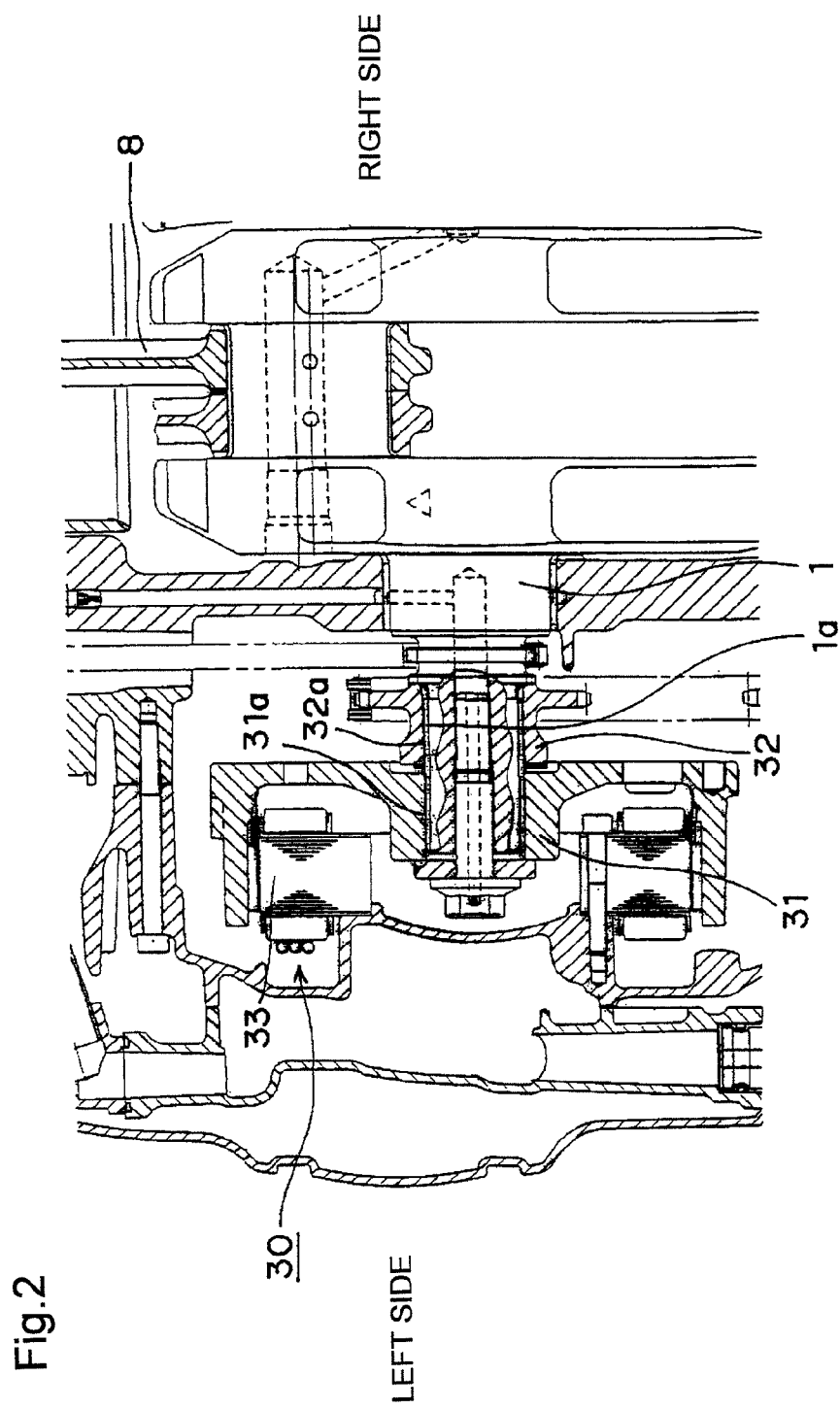
FIG. 2 is a sectional view by the line II-II of FIG. 1.

FIG. 2 is a sectional view by the line II-II of FIG. 1. As shown in FIG. 2, an outer peripheral spline portion 1a is formed in a left end of the crankshaft 1, and spline-fitted to an inner peripheral spline portion 31a of a rotor 31 for a generator 30 and an inner peripheral spline portion 32a of a sprocket 32 for driving a balancer.

In FIG. 2, the rotor 31 for the generator 30 is engaged with the sprocket 32 and spline-fitted to the crankshaft 1 on the left side of the sprocket 32. The rotor 31 is shaped so as to cover a right side surface and an outer peripheral surface of a stator coil 33 without any contact. Therefore, when the crankshaft 1 is rotated, the rotor 31 is accordingly rotated, and the stator coil 33 positioned on the inner side of the rotor 31 in the radial direction of the crankshaft 1 generates induced electromotive force, so that power required for the motorcycle, for example, power for electric equipment such as a headlight and the ECU 26 is generated.

Figure 3:
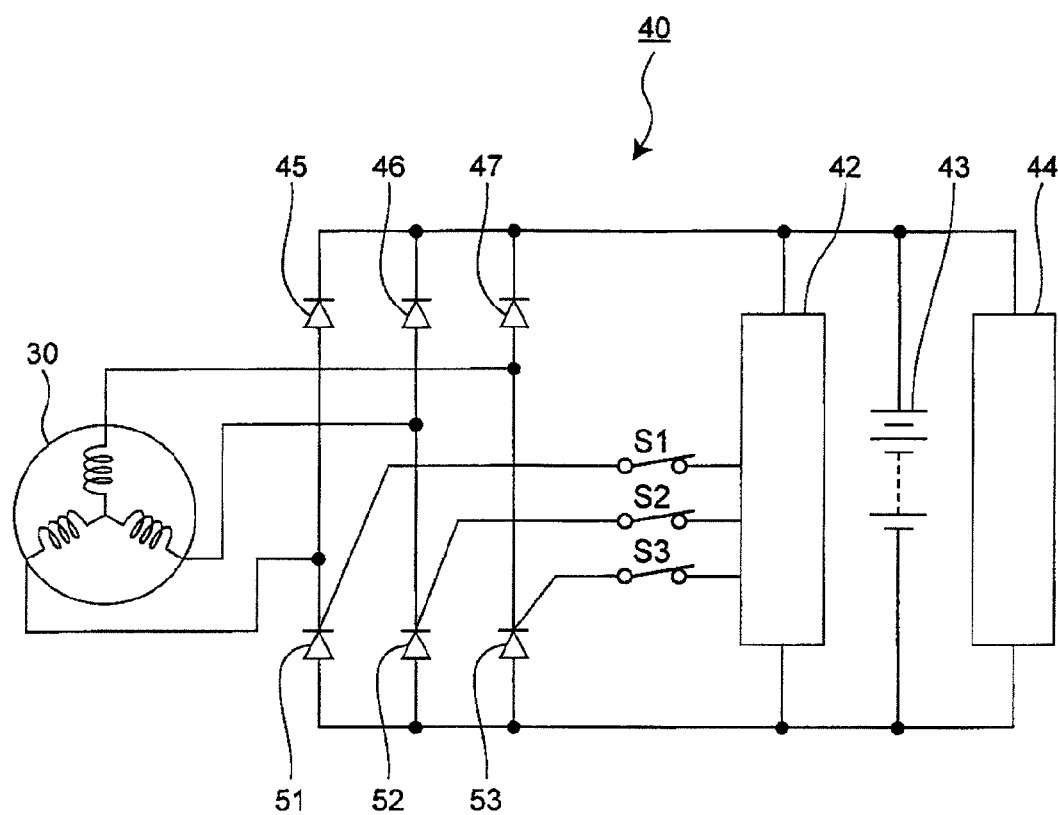
FIG. 3 is a diagram of a three-phase AC electric circuit connecting a generator 30 with a power generation control device 42, a charging device 43, and a load 44.

FIG. 3 shows a three-phase AC electric circuit 40 connecting the generator 30 with a power generation control device 42, a charging device 43, and a load 44. The power generated in the generator 30 is rectified from AC to DC by the power generation control device 42, and with voltage thereof being controlled, the power is sent to the charging device 43 and the load 44. Voltage of the generator 30 is varied by the speed of the crankshaft 1. Thus, when this voltage variation is directly transmitted to the load 44, devices of the load 44 are sometimes not normally operated. Therefore, in order not to apply voltage of a predetermined value or more, the power generation control device 42 controls voltage of the electric circuit 40. The power generation control device 42 is electrically connected to the ECU 26, so as to obtain information on the engine speed, the throttle opening position, and the brake pressure from the ECU 26 and control the generator 30.

The electric circuit 40 further has diodes 45, 46, 47, thyristors 51, 52, 53, and switches S1, S2, S3. The control device 42 controls ON/OFF of the switches S1, S2, S3. When the control device 42 turns ON the switch S1, an electric current flows to a gate of the thyristor 51, and the thyristor 51 is turned ON. When the control device 42 turns OFF the switch S1, the electric current stops flowing to the gate of the thyristor 51, and the thyristor 51 is turned OFF. A relationship between the switch S2 and the thyristor 52 and a relationship between the switch S3 and the thyristor 53 are the same as a relationship between the switch S1 and the thyristor 51. As described above, by turning ON/OFF the switches S1, S2, S3, the power generation control device 42 can increase or decrease the phase number for connecting the generator 30 and the power generation control device 42. As a result, a power generation amount of the generator 30 can be increased or decreased. In the present description, the power generation amount corresponds to a power generation ability required for rotating the rotor at predetermined speed by a predetermined amount. For example, in a case where the power generation amount is low, a load required for rotating the rotor is smaller than a case where the power generation amount is high.

Figure 4:
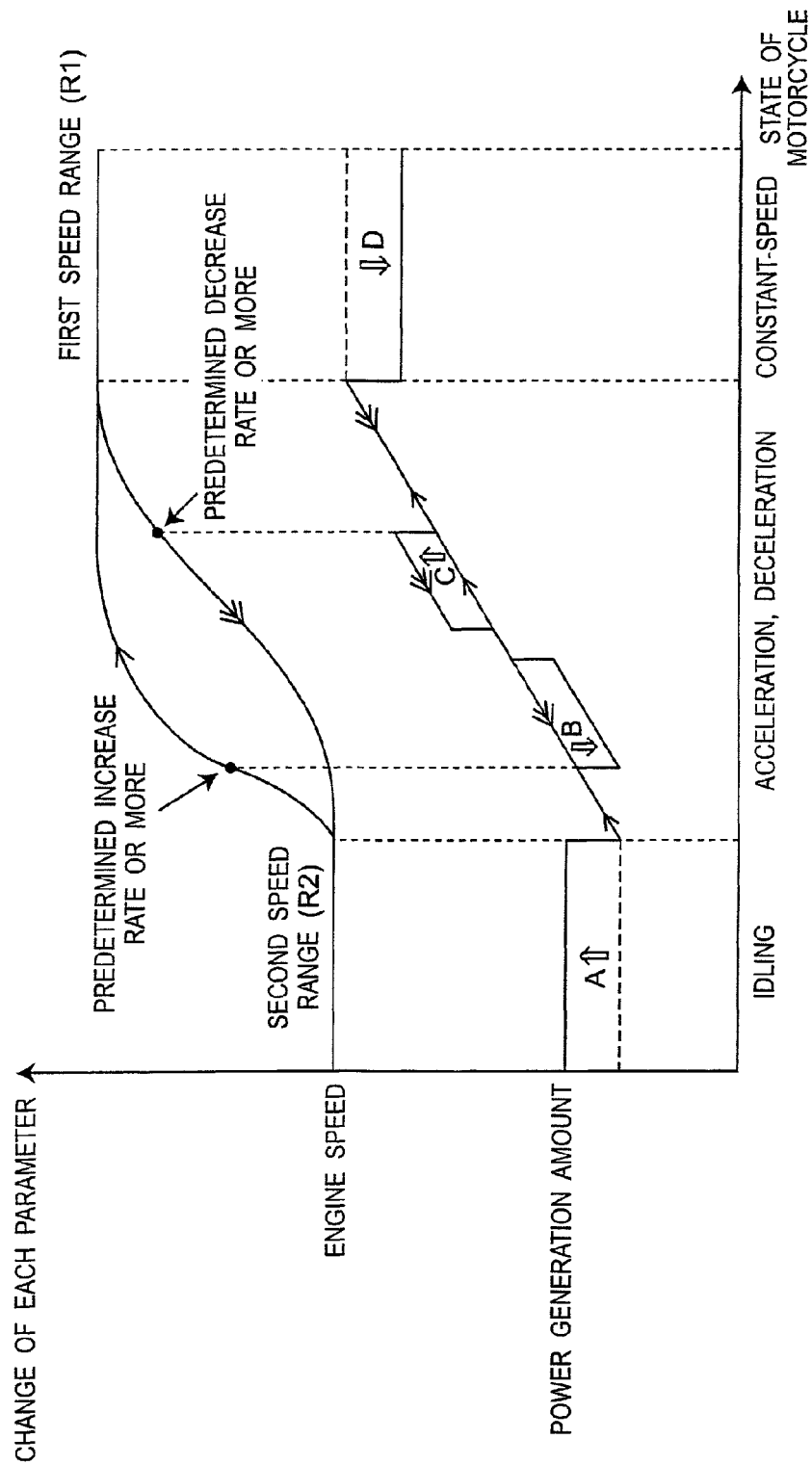
FIG. 4 is a graph showing a relationship between engine speed and a power generation amount.
Figure 5:
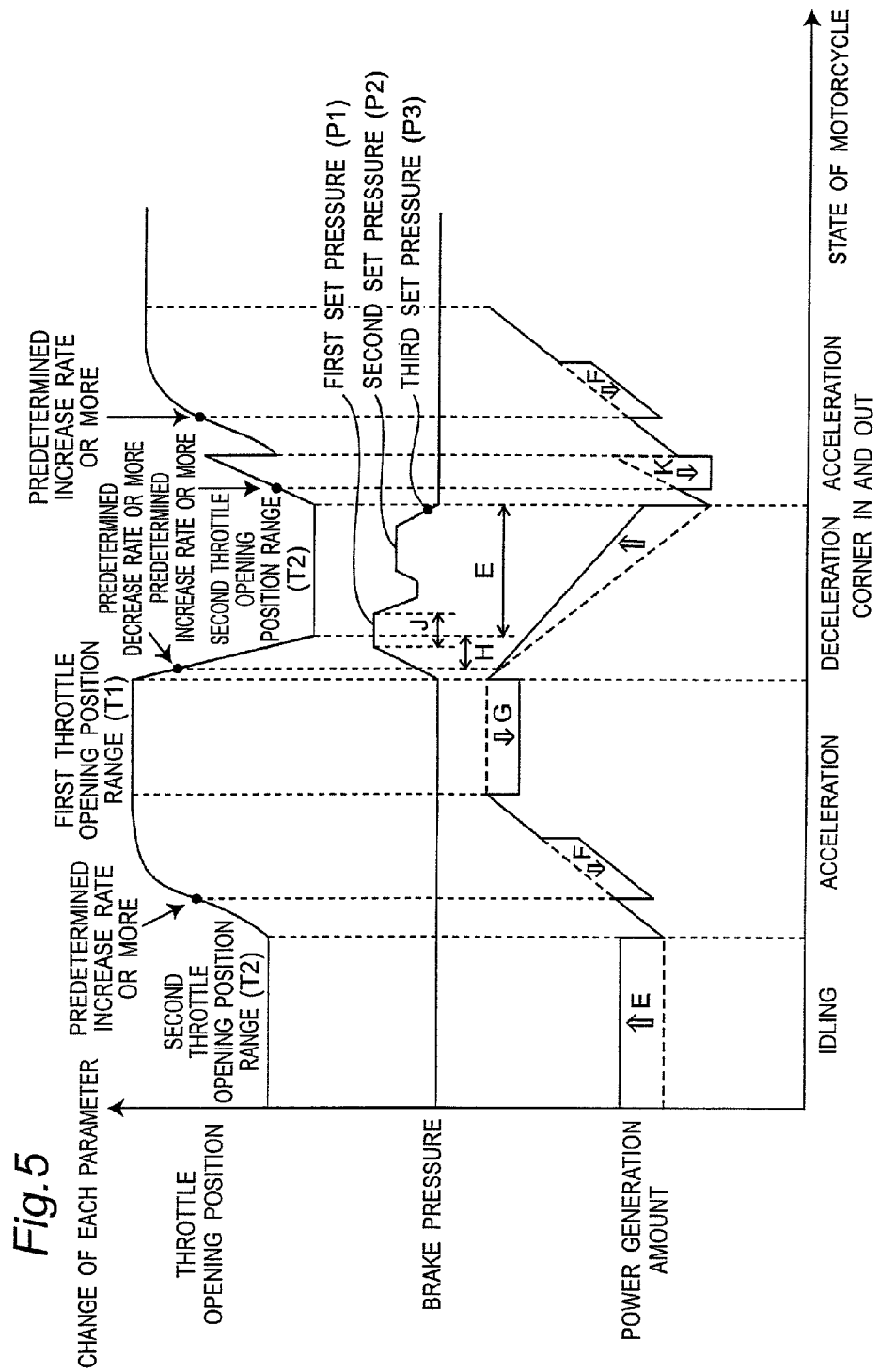
FIG. 5 is a graph showing a relationship between a throttle opening position, brake pressure, and the power generation amount.

FIGS. 4 and 5 are graphs showing outlines of control methods by which the power generation control device 42 increases or decreases the power generation amount of the generator 30. Hereinafter, with reference to FIGS. 4 and 5, control of the power generation control device 42 will be described. The generator 30 and the power generation control device 42 are normally connected by two phases (the switch S1 is turned OFF and the switches S2, S3 are turned ON in the present embodiment).

FIG. 4 is the graph showing a relationship between the engine speed and the power generation amount relative to a state change of the motorcycle (horizontal axis). During idling, the engine speed of the motorcycle (vertical axis) is speed (such as 600 to 800 rpm within a second speed range R2) which is lower than rated speed (such as 6,000 rpm). When the ECU 26 detects that the engine speed is within the second speed range R2, as shown by an arrow A of FIG. 4, the power generation control device 42 turns ON the turned-OFF switch S1 and makes the phase number for connecting the generator 30 and the power generation control device 42 three, so as to increase the power generation amount of the generator 30. Preferably, the power generation control device 42 increases the phase number for connecting the generator 30 and the power generation control device 42 while the engine speed is within the second speed range R2.

At the time of acceleration, the engine speed of the motorcycle is increased, and the power generation amount of the generator is accordingly increased. When the ECU 26 detects that an engine speed increase rate is predetermined value or more, as shown by an arrow B of FIG. 4, the power generation control device 42 turns OFF one of the turned-ON switches S2, S3 and makes the phase number for connecting the generator 30 and the power generation control device 42 one, so as to lower the power generation amount of the generator 30. Preferably, the power generation control device 42 decreases the phase number for connecting the generator 30 and the power generation control device 42 while the crankshaft is rotated twice (about 0.02 seconds in a case of 6,000 rpm).

At the time of deceleration, the engine speed of the motorcycle is decreased, and the power generation amount of the generator is accordingly decreased. When the ECU 26 detects that an engine speed decrease rate is a predetermined value or more, as shown by an arrow C of FIG. 4, the power generation control device 42 turns ON the turned-OFF switch S1 and makes the phase number for connecting the generator 30 and the power generation control device 42 three, so as to increase the power generation amount of the generator 30. Preferably, the power generation control device 42 increases the phase number for connecting the generator 30 and the power generation control device 42 while the crankshaft is rotated twice (about 0.02 seconds in a case of 6,000 rpm).

At the time of constant-speed driving, the engine speed of the motorcycle is speed close to rated speed (within a first speed range R1) such as 5,000 rpm or more and 6,000 rpm or less. When the ECU 26 detects that the engine speed is within the first speed range R1, as shown by an arrow D of FIG. 4, the power generation control device 42 turns OFF one of the turned-ON switches S2, S3 and makes the phase number for connecting the generator 30 and the power generation control device 42 one, so as to lower the power generation amount of the generator 30. Preferably, the power generation control device 42 decreases the phase number for connecting the generator 30 and the power generation control device 42 while the engine speed is within the first speed range R1.

FIG. 5 is the graph showing a relationship between the throttle opening position, the brake pressure, and the power generation amount relative to the state change of the motorcycle (horizontal axis). During idling, the throttle opening position of the motorcycle (vertical axis) is a small value (within a second throttle opening position range T2). When the ECU 26 detects that the throttle opening position is within the second throttle opening position range T2, as shown by an arrow E of FIG. 5, the power generation control device 42 turns ON the turned-OFF switch S1 and makes the phase number for connecting the generator 30 and the power generation control device 42 three, so as to increase the power generation amount of the generator 30. Preferably, the power generation control device 42 increases the phase number for connecting the generator 30 and the power generation control device 42 while the throttle opening position is within the second throttle opening position range T2.

At the time of acceleration, the throttle opening position of the motorcycle is increased, and the power generation amount of the generator is accordingly increased. When the ECU 26 detects that a throttle opening increase rate is a predetermined value or more, as shown by an arrow F of FIG. 5, the power generation control device 42 turns OFF one of the turned-ON switches S2, S3 and makes the phase number for connecting the generator 30 and the power generation control device 42 one, so as to lower the power generation amount of the generator 30. Preferably, the power generation control device 42 decreases the phase number for connecting the generator 30 and the power generation control device 42 while the crankshaft is rotated twice (about 0.02 seconds in a case of 6,000 rpm).

After that, the throttle opening position becomes a high value (within a first throttle opening position range T1). When the ECU 26 detects that the throttle opening position is within the first throttle opening position range T1, as shown by an arrow G of FIG. 5, the power generation control device 42 turns OFF one of the turned-ON switches S2, S3 and makes the phase number for connecting the generator 30 and the power generation control device 42 one, so as to lower the power generation amount of the generator 30. Preferably, the power generation control device 42 decreases the phase number for connecting the generator 30 and the power generation control device 42 while the throttle opening position is within the first throttle opening position range T1.

At the time of deceleration, the throttle opening position of the motorcycle is decreased, and the power generation amount of the generator is accordingly decreased. When the ECU 26 detects that a throttle opening decrease rate is a predetermined value or more, as shown by an arrow H of FIG. 5, the power generation control device 42 turns ON the turned-OFF switch S1 and makes the phase number for connecting the generator 30 and the power generation control device 42 three, so as to increase the power generation amount of the generator 30. Preferably, the power generation control device 42 increases the phase number for connecting the generator 30 and the power generation control device 42 while the crankshaft is rotated twice (about 0.02 seconds in a case of 6,000 rpm).

At the time of deceleration, the brake pressure of the motorcycle is a predetermined value or more (first set pressure P1 or more). When the ECU 26 detects that the brake pressure is the first set pressure P1 or more, as shown by an arrow J of FIG. 5, the power generation control device 42 turns ON the turned-OFF switch S1 and makes the phase number for connecting the generator 30 and the power generation control device 42 three, so as to increase the power generation amount of the generator 30. Preferably, the power generation control device 42 increases the phase number for connecting the generator 30 and the power generation control device 42 while the brake pressure is the first set pressure P1 or more.

When the motorcycle comes in and, gets out of corner, the brake pressure of the motorcycle becomes a predetermined value or more (second set pressure P2 (predetermined pressure) or more) such as 20 kPa or more and then becomes a predetermined value or less (third set pressure P3 (other set pressure which is lower than the predetermined pressure) or less) such as 5 kPa or less, and the throttle opening position of the motorcycle shifts from a predetermined throttle opening amount such as 0% to a predetermined throttle opening increase rate or more such as 10% or more. When the ECU 26 detects that the brake pressure becomes the second set pressure P2 or more and then becomes the third set pressure P3 or less and also detects that the throttle opening position shifts from the predetermined throttle opening amount to the predetermined throttle opening increase rate or more, as shown by an arrow K of FIG. 5, the power generation control device 42 turns OFF the turned-ON switches S2, S3 and cuts off connection between the generator 30 and the power generation control device 42, so as to make the power generation amount of the generator 30 zero. Preferably, the power generation control device 42 cuts off the connection between the generator 30 and the power generation control device 42 while the crankshaft is rotated twice (about 0.02 seconds in a case of 6,000 rpm).

When the ECU 26 detects that the slip ratio, that is, the ratio of the front wheel rotation number and a difference between the rear wheel rotation number and the front wheel rotation number is a predetermined value (first slip ratio) or less, the power generation control device 42 turns OFF one of the turned-ON switches S2, S3 and makes the phase number for connecting the generator 30 and the power generation control device 42 one, so as to lower the power generation amount of the generator 30. Preferably, the power generation control device 42 decreases the phase number for connecting the generator 30 and the power generation control device 42 while the slip ratio is the first slip ratio or less.

When the ECU 26 detects that the slip ratio is a predetermined value (second slip ratio) or more, the power generation control device 42 turns ON the turned-OFF switch S1 and makes the phase number for connecting the generator 30 and the power generation control device 42 three, so as to increase the power generation amount of the generator 30. Preferably, the power generation control device 42 increases the phase number for connecting the generator 30 and the power generation control device 42 while the slip ratio is the second slip ratio or more.

According to the power generation control device 42 of the present embodiment, the following effects can be obtained.

(1) When the load by power generation of the generator 30 may be increased, for example, at the time of idling and deceleration, the power generation amount of the generator 30 can be increased, so that an output of the motorcycle can be improved.

(2) When a driving property of the motorcycle is to be improved, for example, at the time of acceleration, the load by the power generation of the generator 30 can be reduced, so that the driving property of the motorcycle can be improved.

The generated power amount of the generator 30 is designed to exceed a consumed power amount of the motorcycle in an engine speed range at the time of constant-speed driving, and surplus power is converted into heat and dumped. When the power generation control device 42 decreases the phase number for connecting the generator 30 and the power generation control device 42 at the time of constant-speed driving as in the present embodiment, the driving property of the motorcycle can be improved while an amount of the surplus power converted into heat and dumped is reduced.

(3) When the motorcycle comes in the corner, the throttle valve 15 is once closed, and an engine brake is used. After that, when the motorcycle gets out of the corner, the closed throttle valve 15 is opened to accelerate. However, since an ignition property, is inferior, a response of torque to opening of the throttle valve 15 is delayed. Thus, there is a problem that a driver opens the throttle valve 15 too much, excessive torque is generated after that, and hence the driving property is lowered.

Thus, when the power generation amount of the generator 30 is zero in a region where the ignition property of the engine is inferior, for example, at the time of coming in or getting out of the corner as in the present embodiment, the load applied to the engine can be reduced, so that the response of the torque to the opening of the throttle valve 15 can be advanced. That is, when the power generation control device 42 cuts off the connection between the generator 30 and the power generation control device 42, the load by the generator 30 is reduced, so that the torque can be increased. Thus, the driver can be suppressed from opening the throttle valve 15 too much. As a result, hitting by the excessive torque can be prevented, so that the driving property of the motorcycle at the time of coming in or getting out of the corner can be improved.

In the present embodiment, when the motorcycle starts acceleration after getting out of the corner, the power generation amount of the generator 30 may be decreased for a predetermined time. A state that the motorcycle gets out of the corner may be determined by the brake pressure, the throttle opening position, a bank angle, a steering angle, a rotation difference between the front and rear wheels, GPS, and the like.

When the motorcycle accelerates after the engine brake, by decreasing the power generation amount of the generator 30 for a predetermined time, and increasing the power generation amount of the generator 30 after the predetermined time elapses, excessive acceleration caused by too much opening of the throttle valve by the driver can be prevented.

(4) In a state that the slip ratio is the first slip ratio or less and an increase in the slip ratio is permitted, the load by the power generation of the generator 30 can be reduced, so that the driving property of the motorcycle can be improved.

(5) In a case where the slip ratio is the second slip ratio or more, the load by the power generation of the generator 30 can be increased, so that the slip ratio can be decreased.

As described above, in the present invention, the power generation ability can be changed based on an engine parameter influencing an engine output, specifically, the load of the generator can be changed in accordance with the engine output detected from the engine parameter. For example, in a case where the detected engine output is determined to be smaller than an engine output to be required by the driver, by controlling the generator to decrease the load of the generator, the engine output consumed in the generator is suppressed, so that an output transmitted from the engine to driving wheels can be improved.

One example of a case where the engine output is determined to be small is as follows.

<Acceleration Determination> In a case where acceleration of a predetermined value or more is determined. Specifically, the engine speed increase rate is a predetermined value or more, running acceleration is a predetermined value or more, the throttle opening increase rate is a predetermined value or more, or the throttle opening position is a predetermined opening position or more. Acceleration may be determined with using other means.

A threshold value for acceleration determination may be set for every transmission gear ratio. In a case where the transmission gear ratio is small, the threshold value is preferably set to be smaller than a case where the transmission gear ratio is large. This is because output torque tends to be insufficient in a case where the transmission gear ratio is small.

<Abrupt Acceleration Determination> In a case where an acceleration operation immediately after downshift is determined (in a case where acceleration is determined within a predetermined time after the transmission gear ratio is increased), or in a case where a lane change operation at the time of high-speed running is determined (in a case where acceleration is determined from a state that a reduction ratio is low and a state of constant running).

<Need of Torque> When engine high-speed rotation is determined (to supplement a case where an output at the time of the engine high-speed rotation is low), when engine low-speed rotation is determined (to supplement a case where an output at the time of the engine low-speed rotation is low), or in a case where the engine speed is low in a state that the reduction ratio is large (in a case where a possibility of acceleration is high).

<Torque Dip> In a region where an actual engine output is lower than an engine output estimated from an engine output which is obtained in a remaining rotation range (region of a torque dip).

<After Output Suppression> In a case where from a state that the engine output is suppressed by changing an ignition state, fuel injection, and an intake state, the suppression of the engine output is cancelled.

<Rated Speed> In a case of a speed range (rated speed range) frequently used at the time of constant-speed running. As an effect, drive force upon constant-speed running can be improved. The power generation amount may be decreased within the rated speed range and a range exceeding the rated speed range.

For example, in a case where the estimated engine output is determined to be large, by controlling the generator so that the load of the generator is increased, the engine output to be consumed in the generator is increased, so that the output transmitted from the engine to the driving wheels can be suppressed.

One example of a case where the engine output is determined to be large is as follows.

<Deceleration Determination> In a case where deceleration of a predetermined value or less is determined. Specifically, the engine speed decrease rate is a predetermined value or more, running deceleration is a predetermined value or more, the throttle opening decrease rate is a predetermined value or more, or the throttle opening position is a predetermined opening position or less. Deceleration may be determined with using other means.

<Idling> In a running stop state and an engine drive state.

<Torque Peak> In a region where the actual engine output is higher than the engine output estimated from the engine output which is obtained in the remaining rotation range (region of a torque peak).

<Spinning of Wheels>
<Output Suppression> This output suppression includes suppression of the engine output (at least any of ignition, intake, and fuel injection), and in addition, suppression of rotation of the driving wheels themselves such as a brake and an ABS.
<Constant-Speed Running> At the time of constant-speed running with only small output torque in a case where acceleration is zero and the speed is constant for a predetermined time.

By controlling the power generation amount based on an operation of the driver, the power generation amount can be adjusted in accordance with intention of the driver prior to a change in the engine parameter. In particular, the power generation ability is preferably changed based on a speed change command of the driver. For example, by changing the ability based on an accelerator operation, a brake operation, operation amounts of those operations, timing of starting inspection, and a speed change, a response delay until the engine output is changed in accordance with the command of the driver can be supplemented by adjustment of the generation device. For example, the power generation ability may be decreased in accordance with the acceleration operation, or the power generation ability may be increased in accordance with the deceleration operation. In particular, by decreasing the power generation ability when the acceleration operation is performed from a state that the engine output is suppressed, the response delay until the engine output is improved can be supplemented, so that driving feel can be improved.

When it is determined to be in a preliminarily fixed speed range or throttle opening position range, the power generation amount of the generator is changed. In such a way, an influence on running feel by excess and insufficiency of the engine output generated in accordance with the engine speed and throttle opening position ranges can be suppressed.

When an increase in the engine output after suppressing the engine output is detected, the power generation amount is decreased. Thereby, the response delay until the engine output is improved after suppressing the engine output can be supplemented, so that the running feel can be improved. As the state that the engine output is suppressed, a state that the engine brake is activated or an driving operation state before getting out of the corner may be used.

In particular, by detecting the increase in the engine output after suppressing the engine output based on the brake pressure and the throttle opening position, the response delay can be supplemented with favorable precision.

In the present embodiment, when a predetermined condition is satisfied, the power generation amount is adjusted until a preliminarily fixed completion condition is satisfied. Thereby, an excessive adjustment period of the power generation amount can be prevented. The completion condition may be after a predetermined time elapses after starting the adjustment, or the completion condition may be set based on a condition other than time course. In the present invention, adjustment start of the power generation amount is only required to be regulated under a predetermined condition. While the predetermined condition is satisfied, the adjustment of the power generation amount may be continued.

As described above, in the present embodiment, by increasing or decreasing the power generation ability of the generator under a situation that the engine output is transmitted to the driving wheels, the output to be transmitted to the driving wheels is adjusted apart from the adjustment of the engine output. Even in a case where the adjustment is difficult with the engine output, the running feel can be improved.

Specifically preferably, the present invention is provided with the following configurations.

(a) A speed detection device for detecting the engine speed is provided, and when the speed detection device detects that the engine speed is within the first speed range or the engine speed increase rate is a predetermined value or more, the power generation control device decreases the power generation amount of the generator for a predetermined time.

(b) A speed detection device for detecting the engine speed is provided, and when the speed detection device detects that the engine speed is within the second speed range or the engine speed decrease rate is a predetermined value or more, the power generation control device increases the power generation amount of the generator for a predetermined time.

(c) A throttle opening position detection device for detecting the throttle opening position is provided, and when the throttle opening position detection device detects that the throttle opening position is within the first throttle opening position range or the throttle opening increase rate is a predetermined value or more, the power generation control device decreases the power generation amount of the generator for a predetermined time.

(d) A throttle opening position detection device for detecting the throttle opening position is provided, and when the throttle opening position detection device detects that the throttle opening position is within the second throttle opening position range or the throttle opening decrease rate is a predetermined value or more, the power generation control device increases the power generation amount of the generator for a predetermined time.

(e) A brake detection device for detecting the brake pressure is provided, and when the brake detection device detects that the brake pressure is the first set pressure or more, the power generation control device increases the power generation amount of the generator for a predetermined time.

(f) A throttle opening position detection device for detecting the throttle opening position, and a brake detection device for detecting the brake pressure are provided, and when the brake detection device detects that the brake pressure becomes the second set pressure or more and then becomes the third set pressure or less which is lower than the second set pressure and the throttle opening position detection device detects that the throttle opening position shifts from a predetermined throttle opening amount to a predetermined throttle opening increase rate or more, the power generation control device decreases the power generation amount of the generator for a predetermined time or makes the charging device discharge and rotates the rotor of the generator, so as to increase the engine speed.

(g) A slip ratio detection device for detecting the slip ratio based on the wheel rotation number is provided, and when the slip ratio detection device detects that the slip ratio is the first slip ratio or less, the power generation control device decreases the power generation amount of the generator for a predetermined time.

(h) A slip ratio detection device for detecting the slip ratio based on the wheel rotation number is provided, and when the slip ratio detection device detects that the slip ratio is the second slip ratio or more, the power generation control device increases the power generation amount of the generator for a predetermined time.

According to the configurations (a), (b), when the engine speed is within a predetermined range, or when the engine speed increase rate or the engine speed decrease rate is a predetermined value or more, the load by the power generation of the generator can be reduced or the power generation amount of the generator can be increased. As a result, in a state that the driving property of the leisure vehicle is lowered, the load of the generator can be reduced, so that the driving property of the leisure vehicle can be improved. In a state that the load by the power generation of the generator may be increased, the power generation amount of the generator can be increased, so that the output of the leisure vehicle can be improved.

According to the configurations (c), (d), when the throttle opening position is within a predetermined range, or when the throttle opening increase rate or the throttle opening decrease rate is a predetermined value or more, the load by the power generation of the generator can be reduced or the power generation amount of the generator can be increased. As a result, in a state that the driving property of the leisure vehicle is lowered, the load of the generator can be reduced, so that the driving property of the leisure vehicle can be improved. In a state that the load by the power generation of the generator may be increased, the power generation amount of the generator can be increased, so that the output of the leisure vehicle can be improved.

According to the configuration (e), with the brake pressure of a predetermined value or more, that is, in a state that the load by the power generation of the generator may be increased, the power generation amount of the generator can be increased, so that the output of the leisure vehicle can be improved.

According to the configuration (f), in a case where the brake pressure is in a predetermined state and the throttle opening position is in a predetermined state, specifically, in a case where the leisure vehicle comes in the corner and then gets out of the corner, or the like, the engine speed is increased by decreasing the load by the power generation of the generator or making the charging device discharge and rotating the rotor of the generator, so that the driving property of the leisure vehicle can be improved.

According to the configuration (g), in a state that the slip ratio is small and the increase in the slip ratio is permitted, the load by the power generation of the generator can be reduced, so that the driving property of the leisure vehicle can be improved.

According to the configuration (h), in a case where the slip ratio is high, the load by the power generation of the generator can be increased, so that the slip ratio can be decreased.

The present embodiment may further include the following configurations.

In a case where a gear ratio is low, the power generation amount of the generator 30 and/or an auxiliary generator 34 may be decreased. In a case where the gear ratio is high, the power generation amount of the generator 30 and/or the auxiliary generator 34 may be increased.

In an engine start state that the engine is not sufficiently warmed up, for example, at the time of warm-up operation, the power generation amount of the generator may be decreased.

When a charging amount of the charging device is a predetermined value or more, the power generation amount of the generator may be decreased and idling engine speed may be lowered.

In a case where a difference between running acceleration required from an acceleration changing operation and actual running acceleration is a predetermined value or more, the power generation amount of the generator may be decreased. In a case where a difference between running deceleration required from a deceleration operation of a speed changing operation and actual running deceleration is a predetermined value or more, the power generation amount of the generator may be increased.

In an engine drive state in the running stop state (idling state) or in a state that the load given from the driving wheels to a road surface is small, for example, at the time of running on a downward slope, the power generation amount of the generator may be increased.

In a case of constant-speed running at predetermined running speed or more, the power generation amount of the generator may be decreased. In a case of low-speed running at a transmission gear ratio with a large reduction ratio, the power generation amount of the generator may be decreased.

In a case where the engine speed is high, the power generation amount of the generator may be decreased more than a case where the engine speed is low.

(Other Embodiment)

In a case where the generator control device 42 decreases the power generation amount of the generator 30, with the bidirectional type diodes 45, 46, 47 of the electric circuit 40, by further making the charging device 43 discharge and increasing the engine speed from the side of the generator 30, the output of the motorcycle may be improved. In particular, preferably, when the motorcycle comes in and gets out of the corner, by making the charging device 43 discharge and increasing the engine speed from the side of the generator 30, the driving property of the motorcycle is improved.

The adjustment of the power generation amount and the rotation of the rotor may be combined. For example, the power generation amount is decreased, and in a case where further drive force is required, the rotor of the generator may be rotated. In accordance with a situation, a decrease in the power generation amount or the rotation of the rotor may be appropriately used. When the above predetermined condition to decrease the power generation amount is satisfied, instead of decrease adjustment of the power generation amount, the rotor of the generator may be rotated. Thereby, the insufficiency of the engine output can be supplemented by the rotation of the generator. Thus, in comparison to a case where the power generation amount is adjusted, the running feel can be further improved. Where the wheels to which the motive power is transmitted by the generator are the same wheels as the driving wheels to which the motive power is transmitted by the engine, the motive power from the generator can be efficiently transmitted to the driving wheels. Where the wheels to which the motive power is transmitted by the generator are wheels which are different from the driving wheels to which the motive power is transmitted by the engine, the drive force can be given to a plurality of wheels, and force given to the road surface by the wheels can be changed, so that adjustable parameters can be increased.

Figure 6:
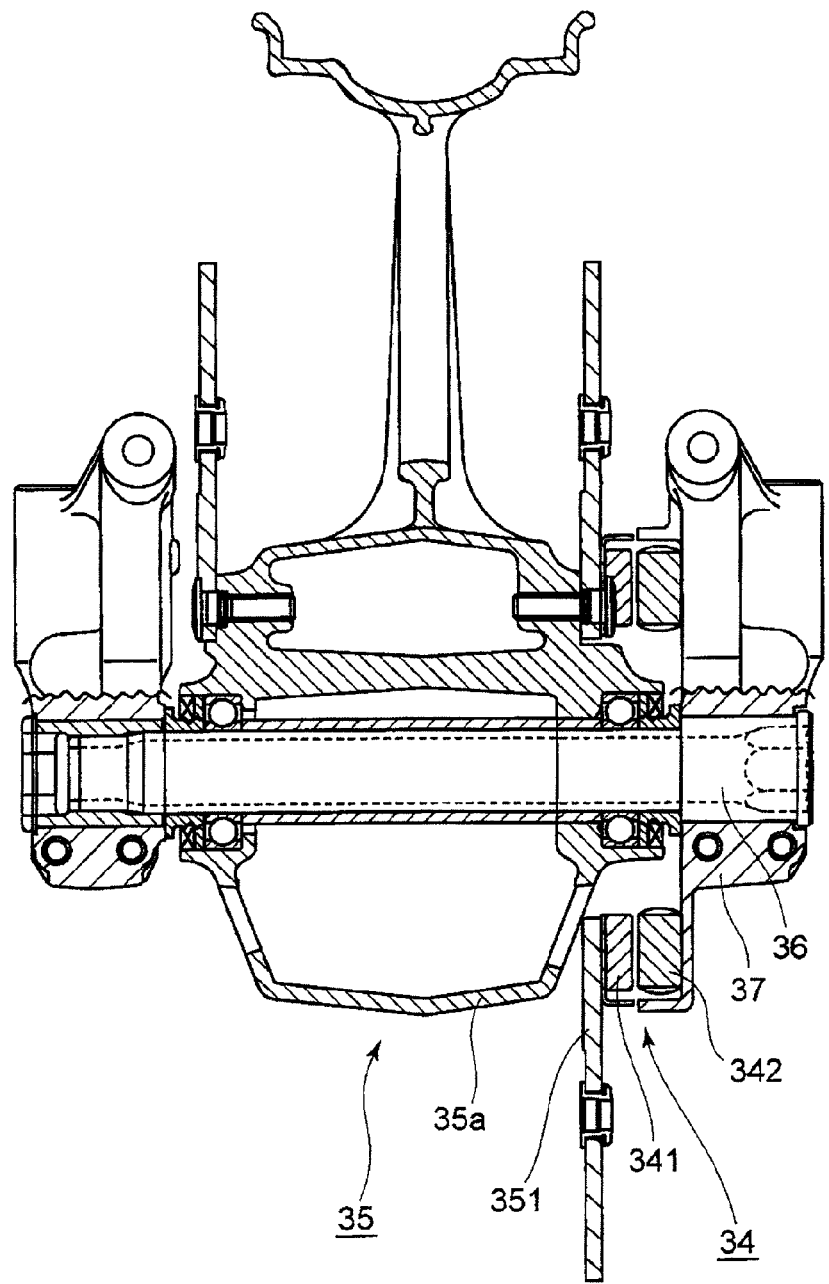
FIG. 6 is a vertically sectional view of a front wheel part of the motorcycle.

In addition to the generator 30 attached to the crankshaft 1 in the above embodiment, the auxiliary generator 34 can be attached to the front wheel. FIG. 6 is a vertically sectional view of a front wheel part of the motorcycle. As shown in FIG. 6, the auxiliary generator 34 has a magnet 341 attached to a front disc brake 351 which is attached to a hub portion 35a of a front wheel 35, and a coil 342 attached to a front fork 37 supporting a front axle 36. The magnet 341 and the coil 342 are provided so as to face each other in the axle direction. When the front wheel 35 is rotated and the disc brake 351 is rotated, as a result, the magnet 341 attached to the disc brake 351 is rotated about the front axle 36 to let the coil 342 attached to the front fork 37 generate the induced electromotive force, so that part of the power required for the motorcycle is generated.

Figure 7:
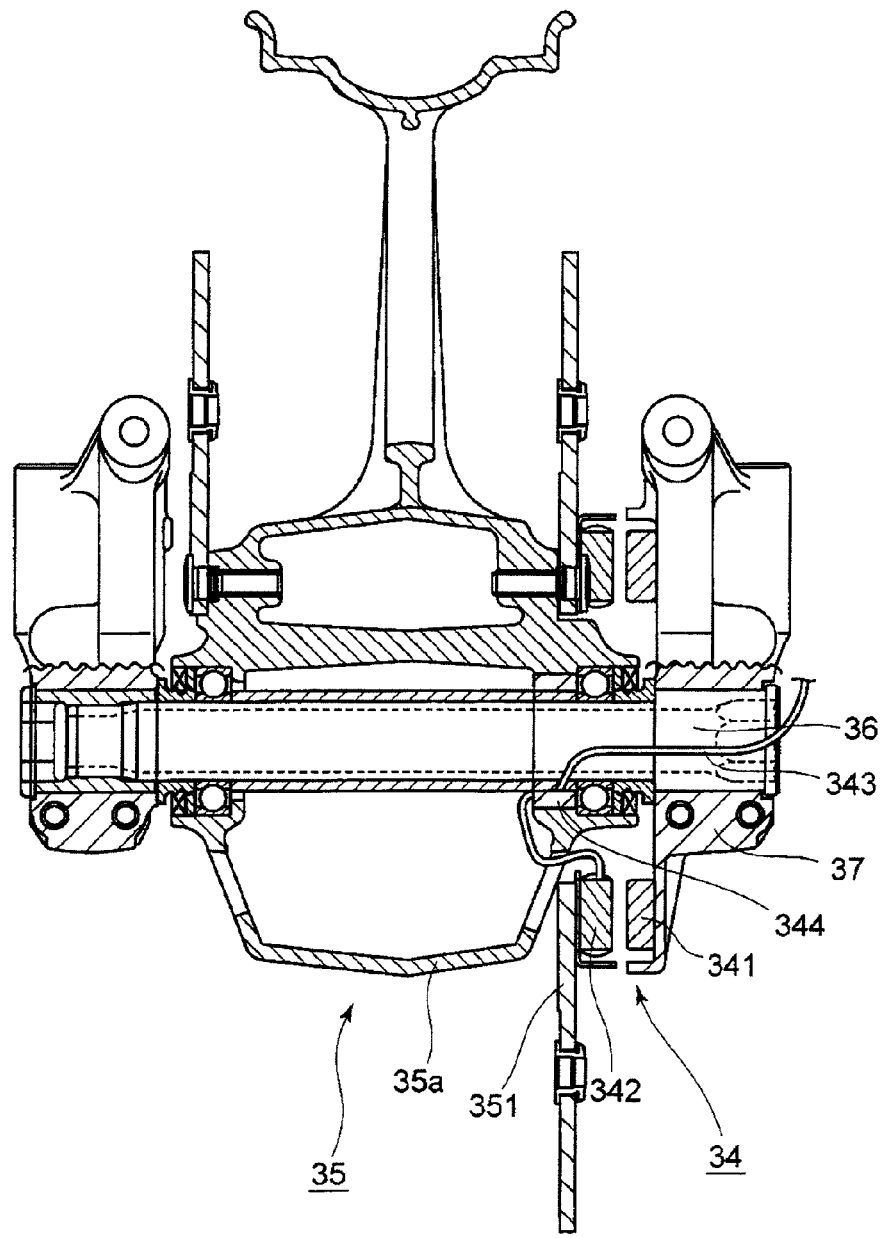
FIG. 7 is a view showing another embodiment of an auxiliary generator.

As shown in FIG. 7, the magnet 341 and the coil 342 may be reversely attached. That is, the magnet 341 may be attached to the front fork 37, and the coil 342 may be attached to the disc brake 351. In this case, since the coil 342 is attached on the rotation side, a cable 343 connected to the charging device 44 and the load 45 is attached to the coil 342 via a slip ring 344. In the present embodiment, the slip ring 344 is attached to the hub portion 35a of the front wheel 35.

Figure 8:
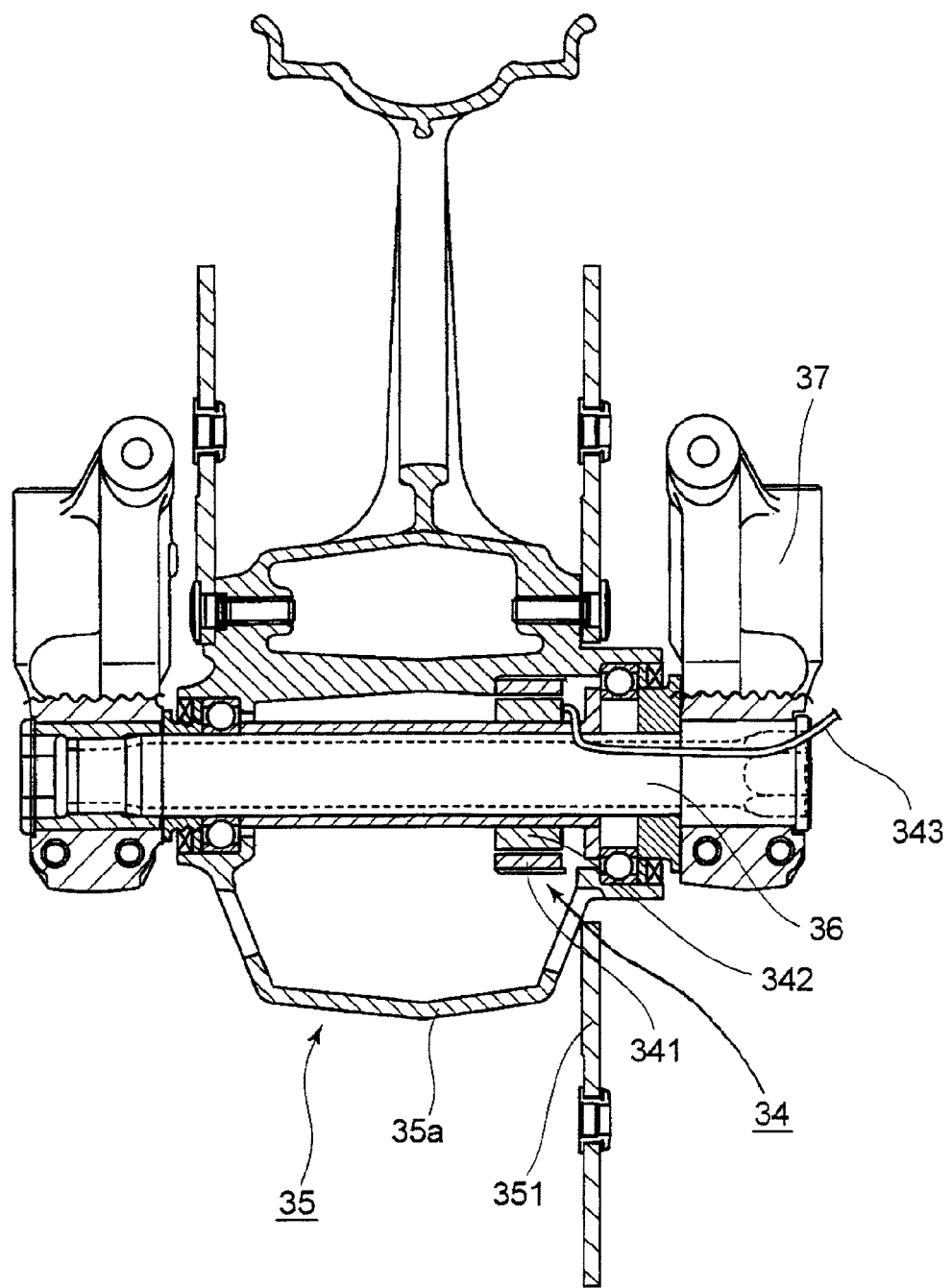
FIG. 8 is a view showing still another embodiment of the auxiliary generator.

Another embodiment of the auxiliary generator 34 will be shown below. FIG. 8 is a vertically sectional view of a front wheel part of the motorcycle. As shown in FIG. 8, the auxiliary generator 34 has the magnet 341 attached to inside of the hub portion 35a of the front wheel 35, and the coil 342 attached so as to be fitted in the circumferential direction of the front axle 36. The magnet 341 and the coil 342 are provided so as to face each other in the direction orthogonal to the axle direction. When the front wheel 35 is rotated, as a result, the magnet 341 attached to the front wheel 35 is rotated about the front axle 36 to let the coil 342 attached to the front axle 36 generate the induced electromotive force, so that part of the power required for the motorcycle is generated.

Figure 9:
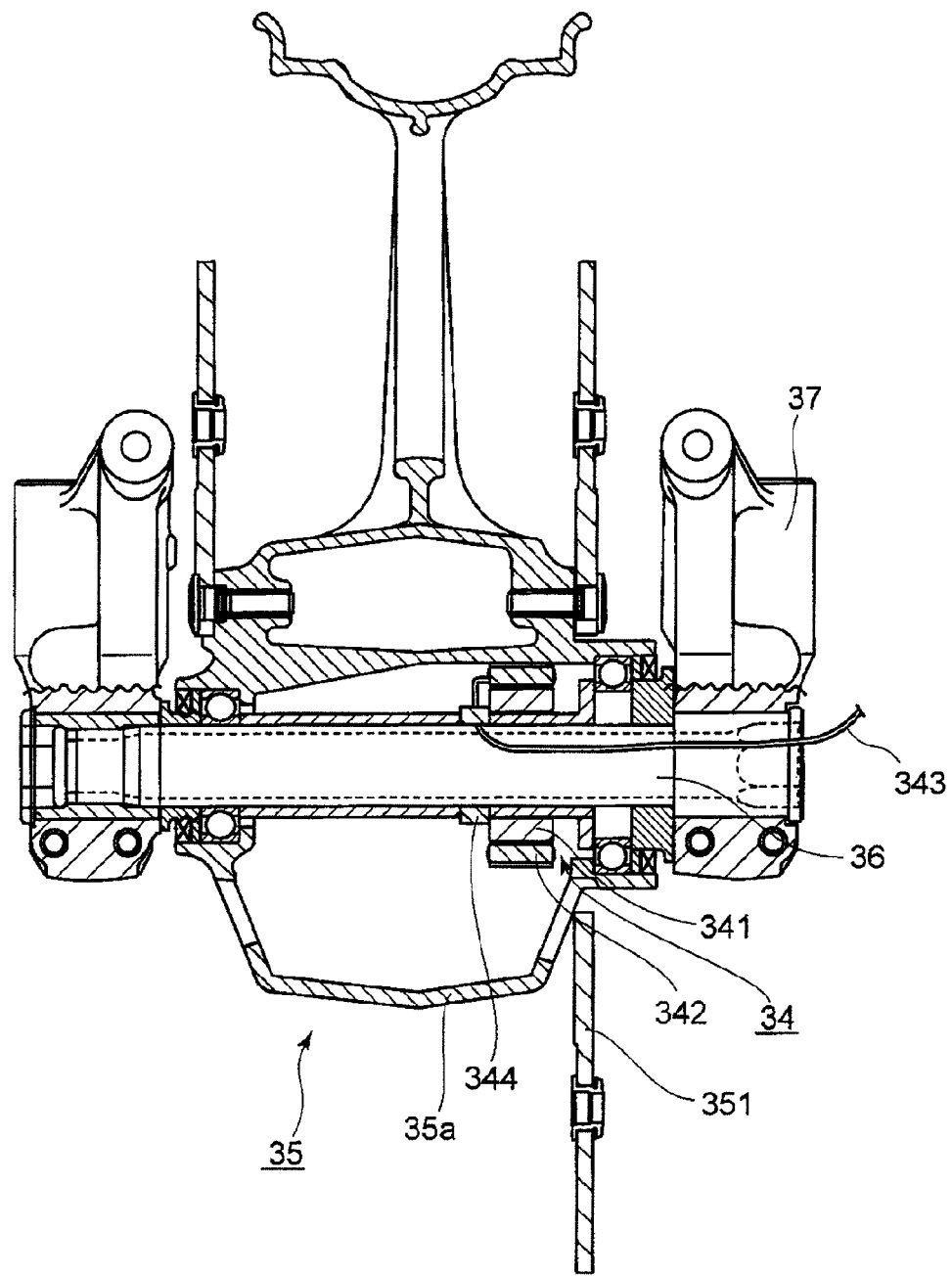
FIG. 9 is a view showing yet another embodiment of the auxiliary generator.
Figure 10:
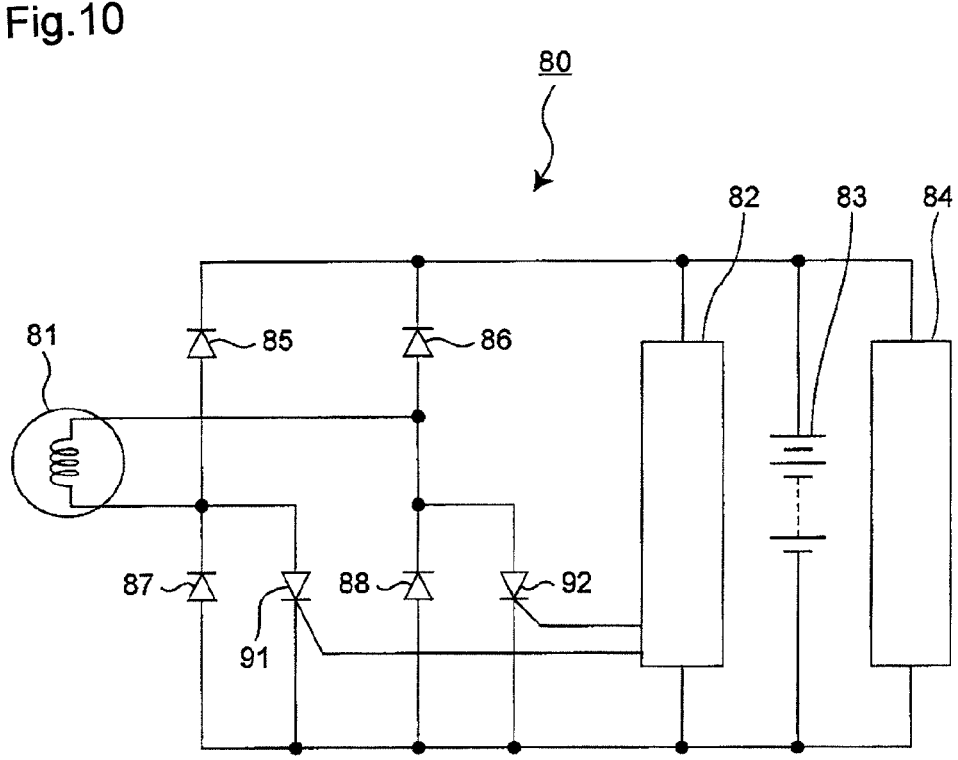
FIG. 10 is an electric circuit diagram of a conventional motorcycle.

As shown in FIG. 9, the magnet 341 and the coil 342 may be reversely attached. That is, the magnet 341 may be attached to the front axle 36, and the coil 342 may be attached to the front wheel 35. In this case, since the coil 342 is attached on the rotation side, the cable 343 connected to the charging device 44 and the load 45 is attached to the coil 342 via the slip ring 344. In the present embodiment, the slip ring 344 is attached to the hub portion 35a of the front wheel 35.

Timing for power generation of the auxiliary generator 34 is preferably timing for increasing the power generation amount of the generator 30 in the above embodiment. A time for the power generation of the auxiliary generator 34 is preferably the same as a time for increasing the power generation amount of the generator 30 in the above embodiment. Timing for rotating a rotor of the auxiliary generator 34 is preferably timing for rotating the rotor of the generator 30.

In a case where the auxiliary generator 34 is provided in the front wheel 35 and the generator 30 is provided on the rear wheel side, the power generation amount of the auxiliary generator 34 may be changed with the same tendency as an action of the generator 30 on the rear wheel side.

The auxiliary generator 34 may perform a different action from the generator 30 on the rear wheel side. For example, when the front wheel 35 slips, the power generation amount of the auxiliary generator 34 may be increased, and when the front wheel 35 is locked, the auxiliary generator 34 may be used as a motor. Even at the time of turning the motorcycle or the like, the power generation amount of the auxiliary generator 34 may be decreased or the auxiliary generator 34 may be used as a motor. Thereby, turning stability can be improved.

Effects by the power generation of the auxiliary generator 34 are the same as the effects by the increase in the power generation amount of the generator 30 in the above embodiment.

In the present embodiment, in a case of predetermined engine speed, a predetermined throttle opening position, predetermined brake pressure, or a predetermined slip ratio, the power generation control device 42 increases or decreases the power generation amount of the generator 30. However, the present invention is not limited to the above case, but the power generation control device 42 controls the power generation amount of the generator 30 under such a condition that the driving property of the motorcycle is preferably improved or the output of the motorcycle is preferably improved.

The present embodiment is described with using a case where the generator 30 and the power generation control device 42 are connected by three phases as a means for increasing or decreasing the power generation amount of the generator 30. However, the connection between the generator 30 and the power generation control device 42 of the present invention is not limited to three phases but the generator and the power generation control device may be connected by six phases, for example.

In the present embodiment, the ECU 26 detects the engine speed. However, the ECU 26 may detect the rear wheel rotation number or the front wheel rotation number, and the power generation amount of the generator 30 may be controlled by the rear wheel rotation number or the front wheel rotation number.

In the present embodiment, the ECU 26 detects the slip ratio from the difference between the rear wheel rotation number and the front wheel rotation number. However, the ECU 26 may detect the slip ratio from a change amount of the rear wheel rotation number.

The "detection" described above includes not only direct detection of an object to be detected from a detection device (sensor) or the like but also indirect detection by estimating the object to be detected based on information obtained from the detection device.

In a case where the motorcycle decelerates and comes in the corner by utilizing the engine brake, and at the time of getting out of the corner, opens the throttle and accelerates, the response of the engine tends to be delayed. For this, in the present embodiment, by decreasing the power generation amount of the generator 30 at the time of getting out of the corner, the output given to the driving wheels can be increased, so that the running feel can be improved. By decreasing the power generation amount of the generator 30 not only at the time of getting out of the corner but also at the time of acceleration after deceleration by the engine brake, the running feel can be improved. In such a way, under a condition that the ignition property of the engine is assumed to be inferior, a condition that an actually obtained output is smaller than an output required by the driver, and the like, by partially or completely cutting the load of the generated power, the driving property can be improved.

In the generator 30 of the present embodiment, the power generation amount is variable. Specifically, in accordance with a change in the power generation amount, the load required for rotating the rotor of the generator 30 is changed. The larger the load is, the larger the power generation amount of the generator 30 is. In the generator 30, the power generation amount may be changeable by plural steps, and two states of a power-generation enabled state and a non power-generation state may be switchable.

In the present embodiment, the motorcycle has the generator 30 whose power generation amount is controlled by the power generation control device 42. However, the motorcycle may have another generator whose power generation amount is fixed in addition to the generator 30.

In the present embodiment, the power generation amount of the generator 30 is increased or decreased by increasing or decreasing the phase number for connecting the generator 30 and the power generation control device 42. However, the power generation amount of the generator 30 may be increased or decreased by other methods. Therefore, the generator 30 is not limited to an AC motor but may be a DC motor. The generator 30 can generate the power based on direct motive power or indirect motive power from the engine. For example, the generator 30 may generate the power based on inertia force of a vehicle running by an engine (rotation of wheels by friction between the road surface and the wheels) as the indirect motive force from the engine. The generator 30 may obtain the motive power from wheels other than the wheels driven by the engine.

The present embodiment is described taking the motorcycle as an example. However, the present invention is not limited to the motorcycle but can be generally applied to leisure vehicles which highly frequently repeat abrupt acceleration and abrupt deceleration. The present invention is preferably applied to relatively light vehicles and favorably used for a riding vehicle, a vehicle having a handlebar, and the like.

The present invention is not limited to the configurations described in the above embodiments but can include various modified examples that a person skilled in the art is able to think of without departing from the contents described in the claims.

Industrial Applicability

In the present invention, the leisure vehicle in which the load applied to the engine is controlled and the driving property and the output are improved can be provided. Thus, industrial applicability is highly valuable.

Reference Signs List

1: Crankshaft, 2: Crankcase, 3: Piston, 4: Cylinder
5: Cylinder head, 6: Intake passage, 6a: Intake valve
7: Exhaust passage, 7a: Exhaust valve
10: Combustion chamber, 11: Ignition plug, 13: Igniter,
14: Kick pedal
15: Throttle valve, 16: Fuel injector, 17: Handle
18: Throttle grip, 19: Rotor, 25: Magnetic pickup
26: ECU
30: Generator, 31: Rotor, 32: Sprocket, 33: Stator coil
34: Auxiliary generator, 341: Magnet, 342: Coil, 343: Cable
344: Slip ring
35: Front wheel, 35a: Hub portion, 351: Disc brake
36: Front axle, 37: Front fork
40: Electric circuit, 42: Power generation control device
43: Charging device, 44: Load
45: Diode, 46: Diode, 47: Diode
51: Thyristor, 52: Thyristor, 53: Thyristor
80: Electric circuit, 81: Generator, 82: Control circuit
83: Charging device, 84: Load
85: Diode, 86: Diode, 87: Diode, 88: Diode
91: Thyristor, 92: Thyristor
S1: Switch, S2: Switch, S3: Switch

The invention claimed is:

1. A leisure vehicle comprising:
   a generator to be driven by an engine for generating power; and
   a power generation control device for controlling said generator, said power generation control device being configured to change a load applied to the engine by power generation of said generator;
   wherein said power generation control device is configured to increase or decrease an amount of the load applied to the engine by the power generation of said generator based on a predetermined condition;
   wherein said power generation control device is configured to change the load applied to the engine by the power generation of said generator by increasing and decreasing a phase number for connecting said generator and said power generation control device; and
   wherein said generator and said power generation control device are connected by:
   two phases when a speed of the vehicle is substantially constant
   one phase when the vehicle accelerates; and
   three phase when the vehicle decelerates.

2. The leisure vehicle according to claim 1, wherein said power generation control device is configured to decrease the phase number for connecting said generator and said power generation control device when a driving property of the vehicle is to be improved.

3. The leisure vehicle according to claim 1, wherein said power generation control device is configured to increase the phase number for connecting said generator and said power generation control device when a power generation efficiency of the vehicle is to be improved.

4. The leisure vehicle according to claim 1, wherein said power generation control device decreases the phase number for connecting said generator and said power generation control device at a time of constant-speed driving.

5. The leisure vehicle according to claim 1, wherein said power generation control device is configured to cut off a connection between said generator and said power generation control device in a region where an ignition property of the engine is inferior.

6. A leisure vehicle comprising:
   a generator to be driven by an engine for generating power; and
   a power generation control device for controlling said generator, said power generation control device being configured to change a load applied to the engine by power generation of said generator;
   wherein said power generation control device is configured to increase or decrease an amount of the load applied to the engine by the power generation of said generator based on a predetermined condition; and
   wherein said power generation control device is configured to decrease a phase number for connecting said generator and said power generation control device for a predetermined period of time when the vehicle accelerates after turning.

7. The leisure vehicle according to claim 6, wherein said power generation control device is configured to decrease a power generation amount of said generator for a predetermined period of time when the vehicle accelerates after engine braking, and is configured to increase the power generation amount of said generator after the predetermined period of time elapses.

8. The leisure vehicle according to claim 6, wherein said power generation control device is configured to increase or decrease a power generation amount of said generator to a particular amount of power generation of said generator for a predetermined time, and is configured to return the power generation amount of said generator from the particular amount to a normal amount after the predetermined time elapses.

* * * * *